United States Patent Office 3,194,710
Patented July 13, 1965

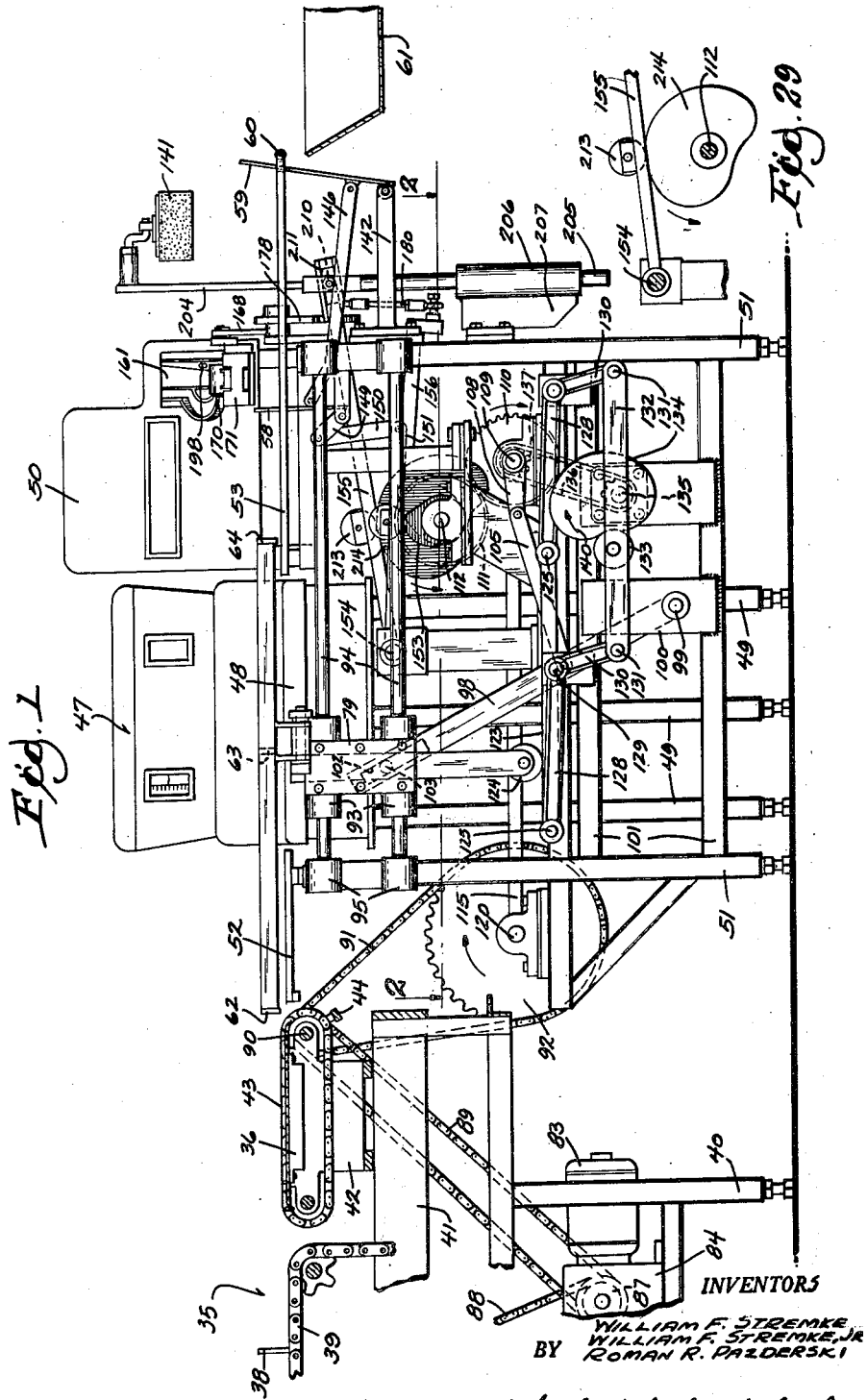

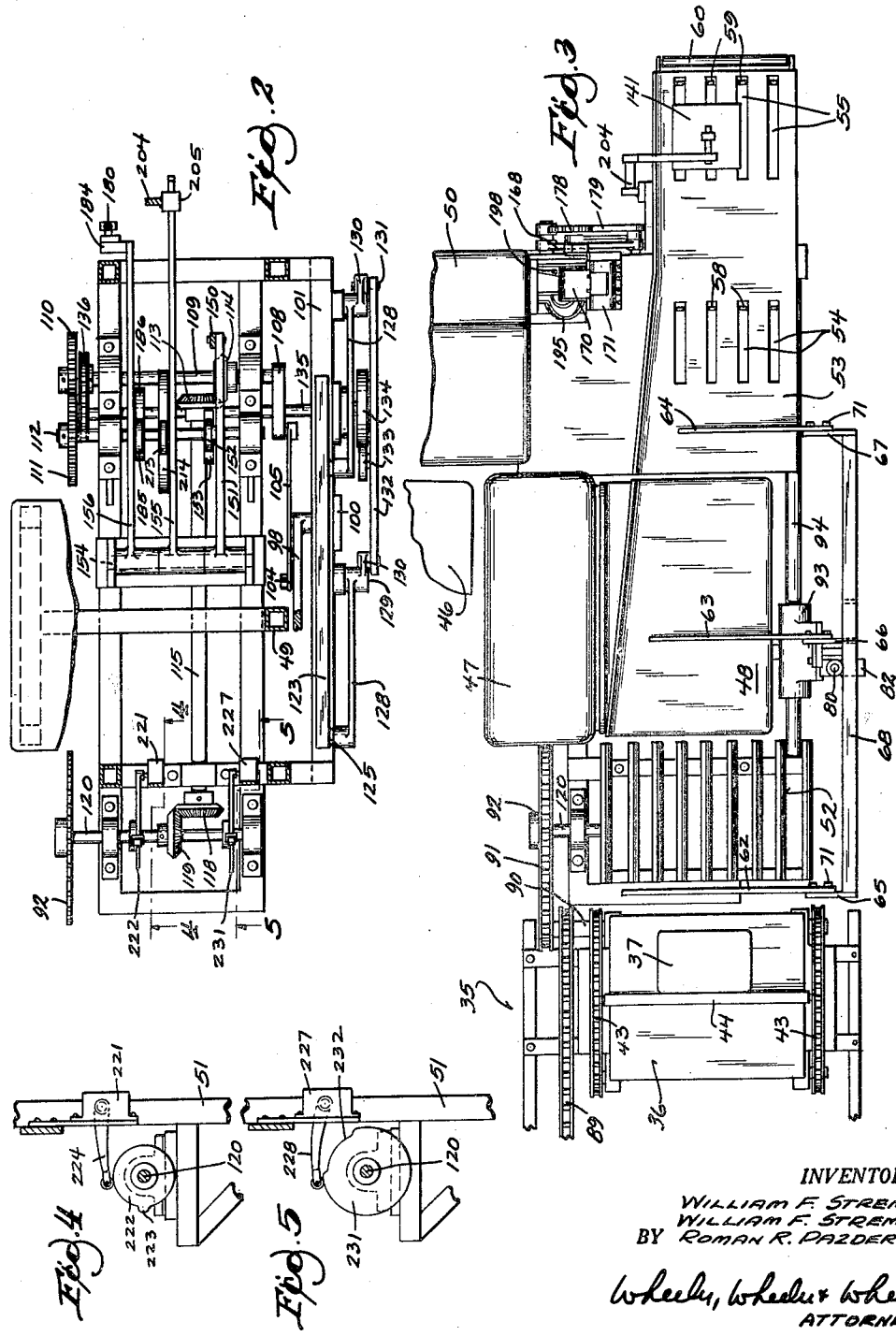

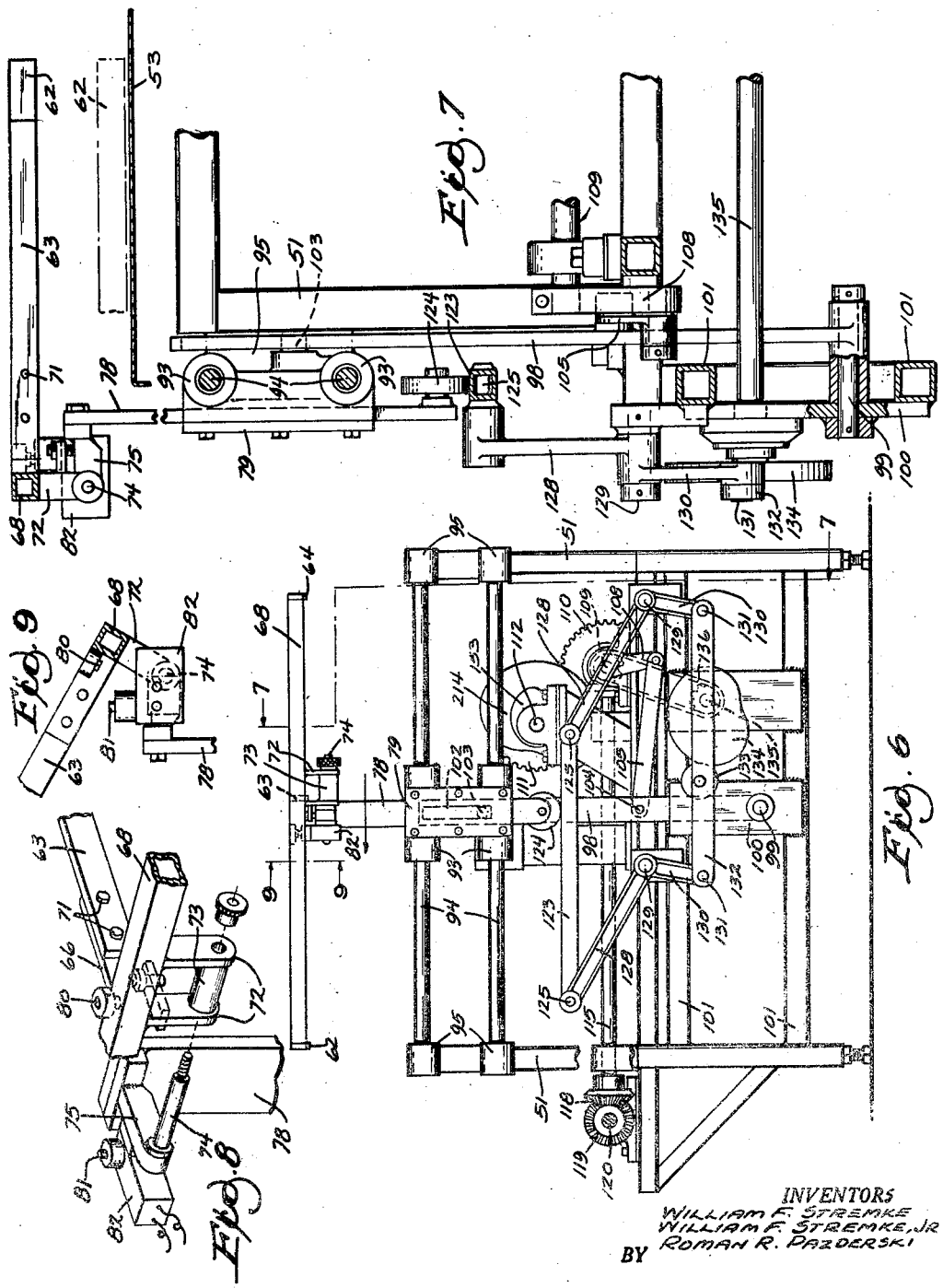

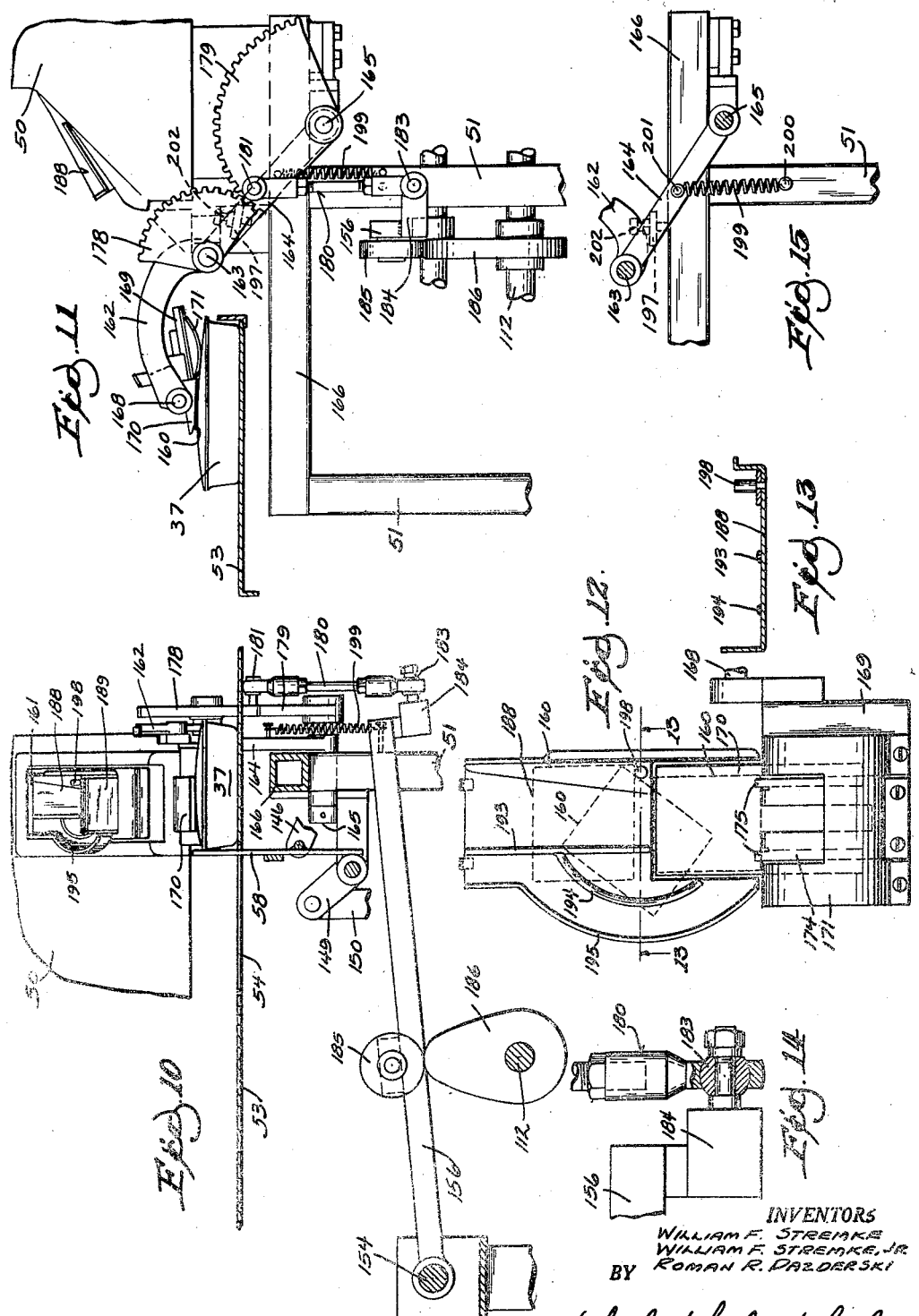

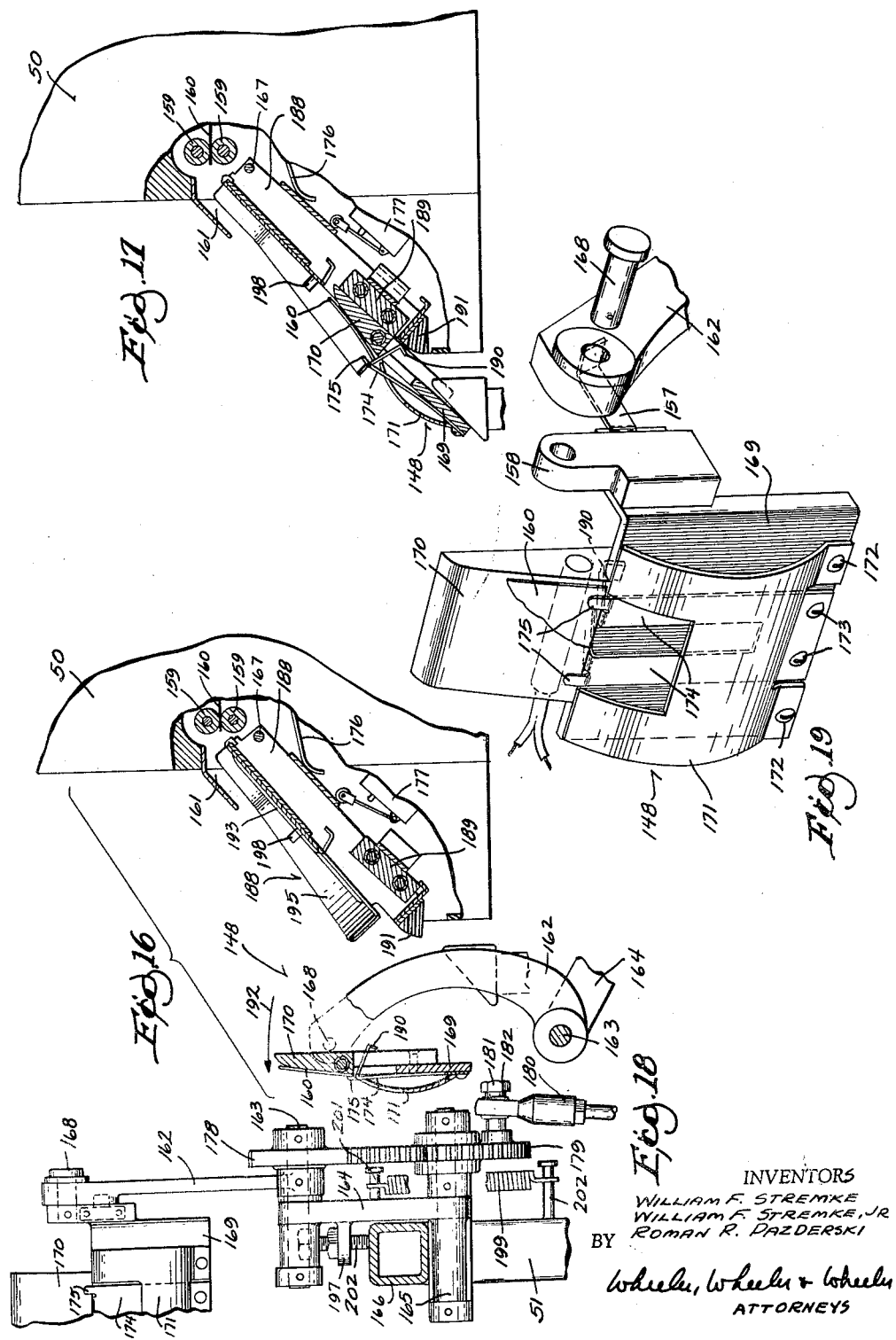

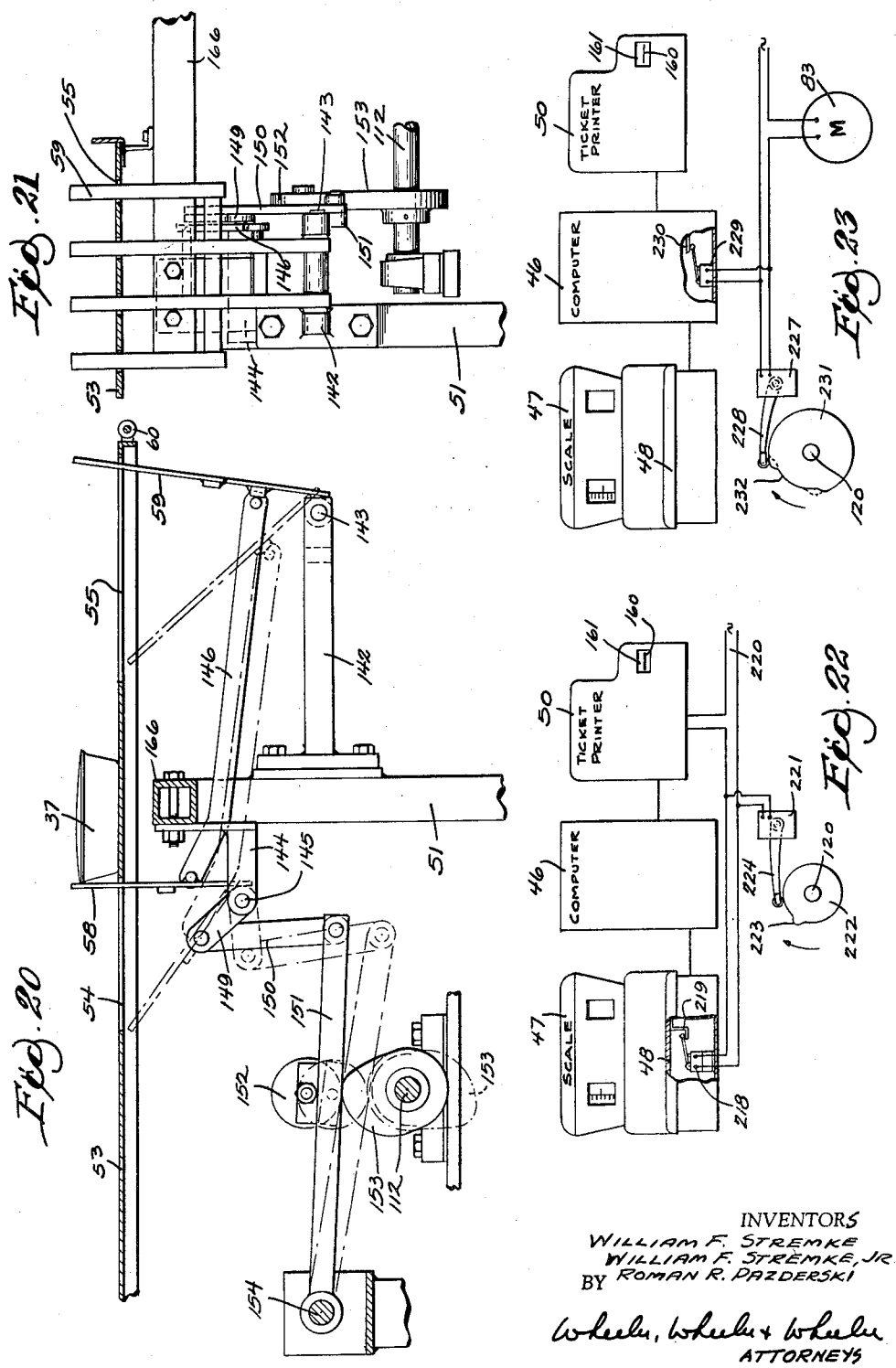

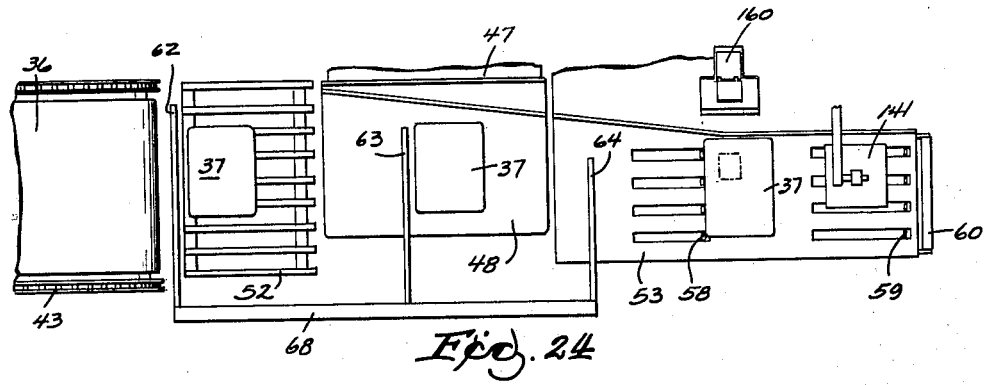
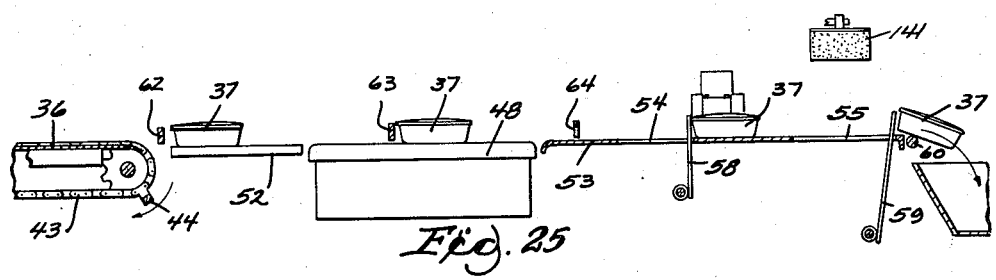
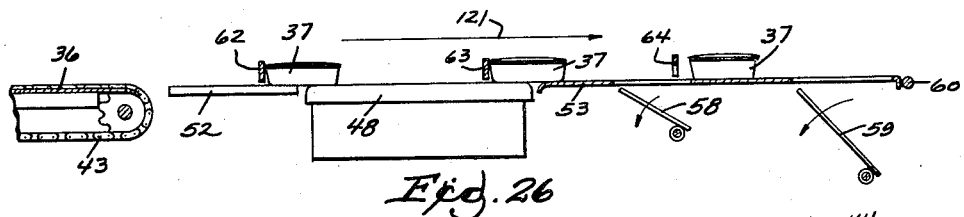
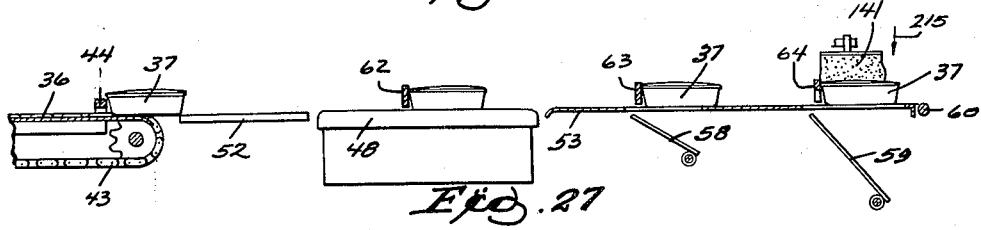
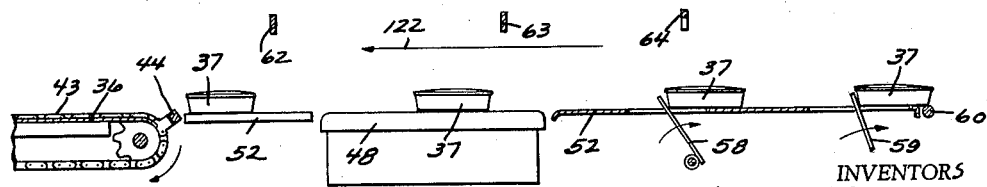

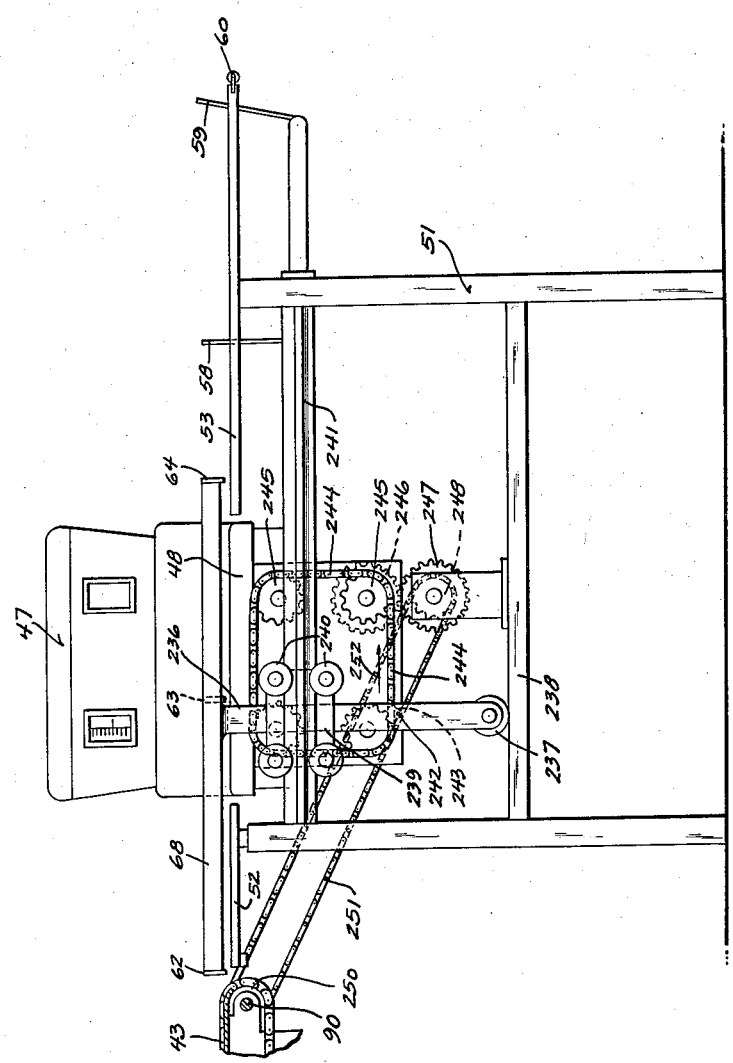

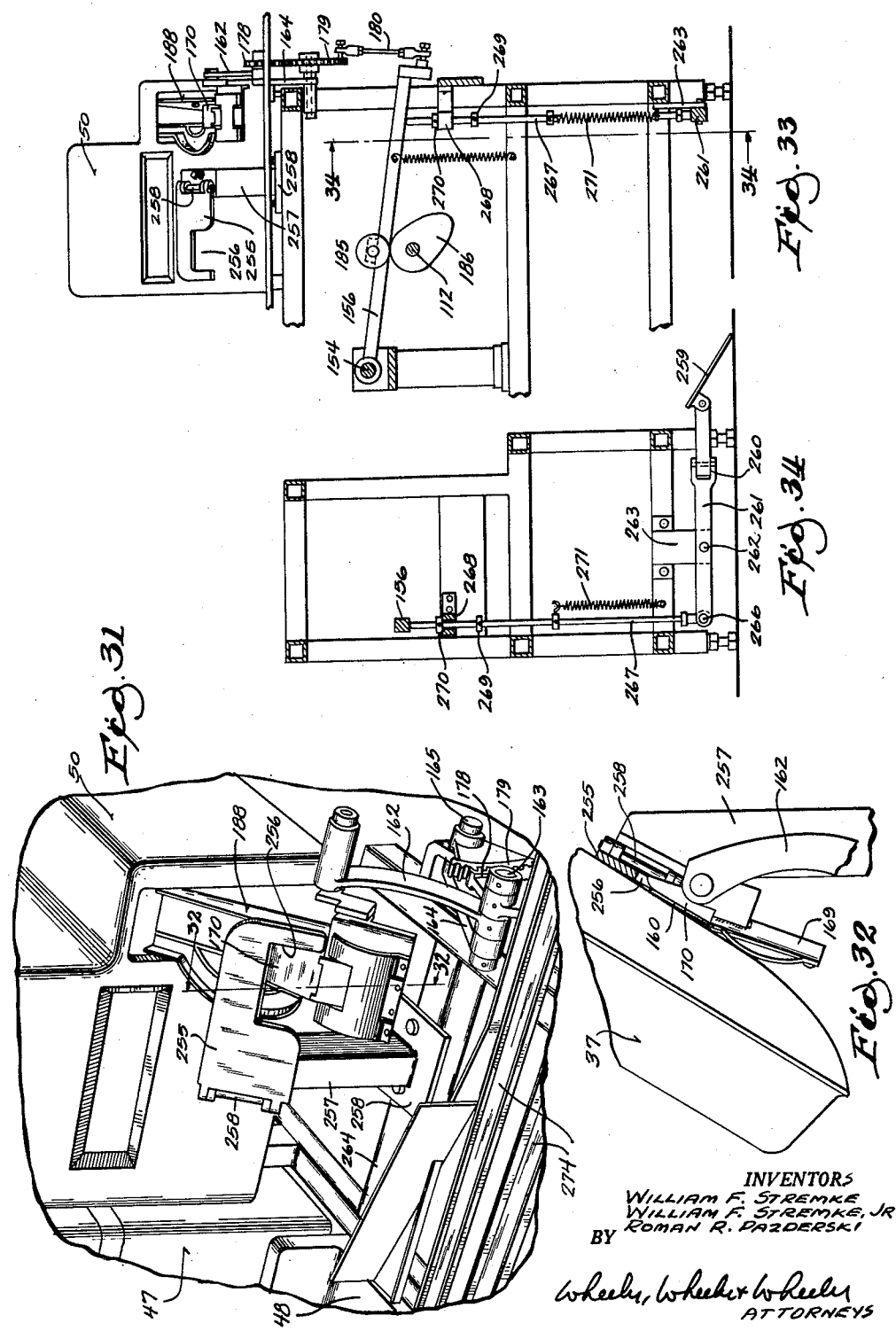

3,194,710
AUTOMATIC LABELLING MACHINE
William F. Stremke, 8031 W. Holmes Ave.; William F. Stremke, Jr., 3329 S. Springfield Ave.; and Roman R. Pazderski, 3844 S. 15th Place, all of Milwaukee, Wis.
Filed Aug. 24, 1960, Ser. No. 51,588
26 Claims. (Cl. 156—360)

This invention relates to a machine to automatically weigh packages and to apply thereto a label bearing weight and price indicia based on the weight reading.

United States Patent No. 2,860,867 shows typical apparatus heretofore available for weighing packages and for printing a label or ticket bearing weight and price indicia. However, the device shown in this prior patent is not fully automatic and requires the attention of an operator to manually place packages on the scale, remove the price and weight-marked ticket from the dispensing slot of the printing portion of the machine and to manually apply the ticket to the package. Apparatus according to the present invention eliminates the need for a labelling machine operator, as the entire operation of moving the packages from one label machine position to the next, weighing the package and applying the price and weight-marked label or ticket thereto is entirely automatic.

The machine of the present invention is characterized by several important features embodying improvements over the prior art and which may be summarized briefly, as follows:

(1) The package conveyor sweep arms and actuating mechanism which operate the package conveyor sweep arms through a cycle of movement to convey packages through successive positions with respect to several operating mechanism stations on the bed of the machine and at which stations the packages are respectively automatically weighed, labelled and discharged from the machine.

(2) The package positioning fingers which move the packages beyond the positions at which they are deposited by the sweep arms.

(3) The transport mechanism which automatically removes a price and weight-marked label from the printing machine and applies it to the top of the appropriate package which corresponds to the weight and price indicia printed on the label.

(4) The electric control system which prevents malfunction of the scale, computer and ticket printer.

Other features, advantages and objects of the invention will appear from the following disclosure in which:

FIG. 1 is a side elevation of a machine embodying the present invention.

FIG. 2 is a horizontal cross section taken along the line 2—2 of FIG. 1.

FIG. 3 is a plan view of the machine shown in FIG. 1.

FIG. 4 is a cross section taken along the line 4—4 of FIG. 2

FIG. 5 is a cross section taken along the line 5—5 of FIG. 2.

FIG. 6 is a fragmentary side elevation of the machine showing the sweep arm carriage in a different position from its position shown in FIG. 1, certain parts being omitted to simplify the showing.

FIG. 7 is an enlarged cross section taken along the line 7—7 of FIG. 6.

FIG. 8 is a fragmentary perspective view showing the interconnections between the sweep arm assembly and the carriage post.

FIG. 9 is a cross section taken along line 9—9 of FIG. 6.

FIG. 10 is a fragmentary vertical cross section taken through the machine to show details of the label transport mechanism and its actuating means.

FIG. 11 is a fragmentary end elevation of the apparatus shown in FIG. 10.

FIG. 12 is an enlarged detailed view of the chute along which the label is conveyed from the ticket printer to the transport mechanism.

FIG. 13 is a fragmentary cross section taken along the line 13—13 of FIG. 12.

FIG. 14 is an enlarged cross section of the articulate coupling between the actuating connection for the label transport mechanism and its cam-operated actuating arm.

FIG. 15 is a fragmentary detailed side elevation of the pivotal mounting of the label transporting swing arm.

FIG. 16 is a fragmentary view, partly in cross section, showing the relationship between the label carrier and the label receiving shelf of the printing machine, the parts being shown with the label carrier swung away from the shelf.

FIG. 17 is a view similar to that shown in FIG. 16, but in which the label carrier rests on the ticket machine shelf.

FIG. 18 is a detail view showing parts of the mechanism for actuating the swing arm.

FIG. 19 is a perspective view in spaced apart relationship of various parts of the label-transporting swing arm.

FIG. 20 is a fragmentary detail view in vertical cross section illustrating the operation of the package positioning fingers and their cam-operated actuating arms.

FIG. 21 is an end elevation of the parts shown in FIG. 20.

FIG. 22 is a diagrammatic illustration of the electrically connected parts including schematically one of the electric circuits which prevents malfunction of the scale, computer and ticket printer.

FIG. 23 is a diagrammatic illustration of the electrically connected parts including schematically another electric circuit to prevent malfunction of the scale, computer and ticket printer.

FIG. 24 is a simplified plan view of certain essential parts of the machine.

FIGS. 25 through 28 are diagrammatic views illustrating the various positions of the sweep arms and positioning fingers as packages are successively conveyed from one station to the next.

FIG. 29 is a fragmentary cross section taken through the cam mechanism for raising and lowering the lever on which the pressure applying pad is mounted.

FIG. 30 is a side elevation of a modified embodiment of the machine, particularly in the mechanism for actuating the sweep arms.

FIG. 31 is a fragmentary perspective view of a modification of the machine which adapts it for labelling packages manually.

FIG. 32 is a fragmentary cross section taken along the line 32—32 of FIG. 31.

FIG. 33 is a fragmentary vertical cross section taken through a machine embodying the modification of FIG. 31 and showing the mechanism for manually actuating the label carrier.

FIG. 34 is a cross section taken along the line 34—34 of FIG. 33.

The machine of the present invention is adapted to receive packages from any source. By way of example, the discharge end 35 of a package wrapping machine similar to the one shown in our United States Patent No. 3,045,406 is shown in FIGS. 1 and 24. The wrapping machine typically includes a hot plate 36 onto which packages 37 are delivered by the push flights 38 on the conveyor chain 39 of the wrapping machine 35. The hot plate 36 seals overlapping ends of the thermoplastic wrapping film about the package 37. The wrapping machine 35 includes a frame having legs 40 which support table 41 on which the frame 42 for the hot plate 36 is mounted.

A conveyor chain 43 carries a flight 44 which will periodically push packages 37 off of the hot plate 36 onto a cooling grid 52 which may conveniently constitute the input end of apparatus embodying the present invention.

Heretofore, packages such as those discharged from wrapping machine 35 could be weighed and price marked by an operator using a computer scale such as is shown in United States Patent 2,860,867. To use such a scale the operator places the package manually upon the scale platform, a computer within the scale computes the weight and price of the package, and a printer mechanism will print a label marked with the weight and price of the package and deliver the printed label to an appropriate dispensing slot. The operator then manually applies the label to the package. As aforestated, the apparatus of the present invention eliminates need for all the manual operations aforesaid and the packages are cyclically moved through the labelling machine where weight and price marked labels are automatically applied to the packages.

In the machine of the present invention, and beyond the grid 52, a scale 47 having a weighing platform 48 is mounted on its own legs 49 to be free of vibrations induced in the labeling machine. Beyond the scale 47 is disposed computer 46 (FIGS. 3, 22, 23) and ticket printer 50 which has a printing mechanism for printing weight and price information on adhesively coated labels 160. The scale 47, computer 46 and printer 50 are conventional and per se constitute no part of the present invention. These components per se function in a manner similar to the components shown in United States Patent 2,800,867 aforesaid.

The labelling machine of the present invention utilizes the scale 47, computer 46 and ticket printer 50 for the functions previously performed by these components and integrates these components into the labelling apparatus in which the packages are successively conveyed from the scale to the ticket printer, apparatus being provided to remove the printed ticket from the ticket printer and apply it to the package for which the label is appropriate.

The labelling machine of the present invention is mounted on legs 51 and has a bed 52, 48, 53 at substantially the same level as the platform 48 of the scale 47. The bed is made up of several parts of the device, including a package receiving platform or grid 52 onto which packages 37 are discharged from the heater 36 by the chain conveyor 43 of the packaging machine 35. Beyond the grid 52 the bed comprises the scale platform 48.

Beyond the scale platform 48 the bed comprises table portion 53 of the labelling machine and onto which packages are conveyed after having been weighed on the scale 47. Table 53 has a first series of longitudinal slots 54 and a second series of longitudinal slots 55 through which first and second sets 58, 59 of retractable fingers are made to oscillate, as will hereinafter be described. The extreme end of the table 53 may be provided with a discharge roller 60 over which packages are conveyed by the fingers 59 to fall into the receiving hopper 61 or alternatively onto a discharge conveyor (not shown). As shown in our copending United States application Serial No. 842,513, such a discharge conveyor can be arranged to return the labelled package to an operator stationed at the infeed end of the wrapping machine 35.

In the illustrated embodiment the packages 37 are conveyed along the bed 52, 48, 53 by a series of laterally extending sweep arms 62, 63, 64, each of which is connected in a sweep arm assembly by bolts 71 (FIG. 8) to the stub arms 65, 66, 67 of the longitudinal connecting rod or arm 68. As best shown in FIGS. 6 and 7, connecting arm 68 has downwardly extending longitudinally spaced ears 72 between which bearing sleeve 83 is mounted. Bearing sleeve 73 slips axially over pivot pin 74 which extends from a bracket 75 affixed to the top end of a post 78 which supports the sweep arm assembly on a cross head carriage 79.

As best shown in FIG. 9, connecting arm 68 is free to swing upwardly about the axis of pin 74. As a consequence thereof, button striker 80 disengages push button 81 of a switch 82 which is in circuit with the power line to electric motor 83 by which the apparatus is powered. Accordingly, if, for any reason, any person's hand or any other part of the body gets beneath one of the arms 62, 63, 64, and the bed of the labelling machine, so that the sweep arm assembly is lifted upwardly about the pivot pin 74, switch 82 will be opened to de-energize the machine.

Motor 83 supplies power concurrently to the wrapping machine 35 and the labelling machine through the gear box 84, the drive sprocket 87 of which drives the chain 88 for the wrapping machine 35 and also drives through the chain 89 a power take-off shaft 90 which drives a chain 91 trained about sprocket 92 on labelling machine power shaft 120. All the moving parts of the labelling machine are driven from shaft 120 (see FIG. 2). Accordingly, the operation of such parts is inherently and cooperatively timed with the operation of the wrapping machine 35. The timing is established in the initial set up of the machine.

Cross head carriage 79 best shown in FIGS. 6 and 7 has two sleeves 93 which reciprocate longitudinally on parallel rods 94 to guide the sweep arm assembly on its path of movement longitudinally of the bed 52, 48, 53. The rods 94 are supported in a fixed position with respect to the bed of the label machine on end caps 95 connected directly to the legs 51 of the machine.

Reciprocating motion is transmitted to the cross head 79 by oscillating lever or pitman 98 best shown in FIGS. 1, 6 and 7 and which has a fixed pivot pin 99 mounted on a bracket plate 100 which bridges across the longitudinal struts 101 which interconnect the legs 51 of the machine. At its end opposite pivot 99, pitman 98 has a slot 102 which provides a lost motion connection through a pin 103 to the cross head 79.

As best shown in FIGS. 2 and 6, at a point intermediate its length, pitman 98 is connected on pin 104 to a link 105 in turn pinned to crank arm 108 fixed on shaft 109, which, as best shown in FIG. 2, has at one end a gear 110 meshing with gear 111 on one end of shaft 112. Power is delivered from transmission shaft 115 to shaft 109 through meshing bevel gears 113, 114. Shaft 115 receives power through meshing bevel gears 118, 119 from the power take-off shaft 120 on which is mounted sprocket 92 aforesaid.

Accordingly, the carriage 79 will be made to reciprocate on the guide rods 94 in time with the delivery of packages 37 to the grid 52, inasmuch as all parts are integrated in the same power transmission train.

The respective arms 62, 63, 64 will sweep along the bed 52, 48, 53 in one direction as shown by the arrow 121 in FIG. 26. When the arms 62, 63, 64 reach the end of their forward movement in the direction of arrow 121 along the machine bed, this position being shown in FIG. 27, the arms will be lifted upwardly for their return stroke in the direction shown by arrow 122 in FIG. 28. This upward movement is accomplished by lifting the track 123 which underlies the post 78 and along which the post rides on its wheel 124.

As best shown in FIGS. 1 and 6, track 123 is provided at both of its ends with pivot pins 125 by which it is pivotally connected to the parallelogram arms 128 of bell cranks which are pivoted on pins 129 to bracket plates 127 fastened to upper strut 101. The bell cranks have crank arms 130 pivotally connected on pins 131 to tie rod 132, which carries a cam follower roller 133 which bears against actuating cam 134 mounted on shaft 135, which, as shown best in FIG. 2, is driven by chain 136 from a suitable sprocket on shaft 109. Accordingly, cam 134 is driven in the direction of arrow 140 (FIG. 1) in timed coordination with the movement of carriage 79.

The periphery of cam 134 is such that at the end of the forward stroke of the sweep arms 62, 63, 64, as illustrated in FIG. 27, track 123 will be elevated as shown in FIG. 6 so that upon the return stroke of the carriage 79, as illustrated in FIG. 28, the elevated sweep arms 62, 63, 64 will return in the direction of arrow 122 over the packages 37 until the arms are restored to positions ahead of any packages on the machine bed, whereupon the track 123 will lower to restore the arms to their positions shown in FIG. 25 in which they are behind such packages and in readiness to sweep the packages along the bed when they are moved in the direction of arrow 121 as shown in FIG. 26.

From the foregoing it is clear that the packages delivered to the labelling machine and onto the grid 52 from the wrapping machine will be successively advanced for a predetermined distance by the sweep arms 62, 63, 64. This distance, as is shown by comparing FIGS. 25 and 27 which show the two extremes of sweep arm movement, is such that in one cycle of sweep arm movement a package 37 will be moved from the grid 52 onto the platform 48 of the scale. A package on the scale will be moved to a position on the bed 53 from whence it will be further advanced by the swing arms 58 and a package previously positioned by swing fingers 58 and to which a label has been affixed by the label transfer arm 162 will be advanced to a position beneath the pressure applying foot which desirably comprises a sponge 141.

The operating mechanism for the swing fingers 58, 59 is best shown in FIGS. 20 and 21. It is the purpose of fingers 58 to precisely locate packages 37 directly opposite the label transport mechanism 148 which coacts with the ticket printing machine 50. It is the purpose of the fingers 59 to sweep the packages off of the bed 53 and into the hopper 61, as is shown in FIG. 25, or onto a discharge conveyor, as aforesaid.

As best shown in FIGS. 1, 20 and 21, an end leg 51 of the labelling machine is provided with a bracket 142 on which the fingers 59 are respectively pivotally mounted on the cross pin 143. Leg 51 is provided with another bracket 144 on which the respective fingers 58 are pivotally mounted on cross pin 145. The respective fingers 58, 59 are interconnected by link 146 so that pivotal motion communicated to fingers 58 will be communicated through link 146 to fingers 59. The cross pin 145 for fingers 58 is provided with a crank arm 149 and a link 150 pivotally connected at one end to the crank arm 149 and pivotally connected at its other end to the lever arm 151. Lever arm 151 carries a cam follower roller 152 which bears by gravity on the cam 153 mounted on shaft 112. As aforesaid, shaft 112 is driven by the meshing gears 110, 111 from shaft 109 and, accordingly movement of the fingers 58, 59 is in timed coordination with the reciprocating movement of the carriage 79.

Lever arm 151 is pivotally mounted on a rock shaft 154 upon which the lever arm 155 for the pressure applying foot 141, and the actuating arm 156 for the label applicator arm 162 are also pivoted, all as shown in FIG. 1.

The sequence of operation of the fingers 58, 59 is best shown in diagrammatic FIGS. 25 through 28. The mechanics of linkage 149, 150 shown in FIG. 20 is such that the rate of swinging movement of the fingers 58 in the course of positioning packages 37 beneath the label applicator arm 162 will slow down near the end of the stroke of fingers 58. Accordingly, the packages 37 will decelerate and there will be no danger of overrun of the packages beyond a position exactly aligned with the label applicator arm 162.

The label applicator is best shown in FIGS. 10 through 19. A fragment of the ticket printing and issuing machine 50 is shown in several of these figures. This machine is not per se any part of the instant invention. It has feed rolls 159 between which a printed ticket or label 160 is fed to a dispensing slot or opening 161. The ticket printing machine chosen to exemplify its environmental location with respect to the label machine of the present invention applies the print to the undersurface of the label, the top surface of the label being provided with a thermoplastic adhesive coating by which the label is adhered to the package.

In prior art use of the ticket printer 50, label 160 is delivered from between the feed rolls 159 onto a heated apron, thus to soften the thermoplastic coating. The package 37 is picked up by an operator and manually pressed against the exposed thermoplastic coating of the label for adherence thereto. The labelled package is then manually deposited in a bin or the like. According to the present invention, however, the label is automatically applied to the package without need for human intervention. For this purpose the machine is provided with a label applying mechanism which in the embodiment illustrated to exemplify the invention includes an arm 162 pivotally connected on pin 163 to a swingable support arm 164 which, in turn, is pivotally connected on a pin 165 to frame portion 166 of the machine.

Arm 162 carries pivotally on a pivot pin 168 and platen bracket 158 a label carrier 148 which includes a platen 169 which carries an electrically energized heating plate 170 onto which the label 160 is deposited by the ticket issuing machine 50. The platen 169 is also provided with a bowed shoe 171 attached by screws 172 to the bottom margin of the platen. Also attached to the bottom margin of the platen by the screws 173 is a bifurcated spring clamp 174 having clamping fingers 175 which are biased to clamp the label 160 against the heating plate 170, as shown in FIG. 19.

Pivotal movement of the label carrier 148 with respect to the arm 162 is limited by hook 157 mounted on platen bracket 158 (FIG. 19) and which engages behind the arm 162.

Arm 162 is provided with means for swinging it pivotally about the pin 163 and which includes a gear segment 178 (FIG. 11) fixed to the arm 162 and a gear segment 179 which meshes with the gear 178 and which is free to pivot about the pin 165.

Gear segment 179 is actuated to oscillate about its pivot 165 by reason of the connection thereto of a link 180 which receives motion from lever arm 156 (FIG. 10). Link 180 is connected at one end to gear segment 179 through crank arm 181 which has a ball joint connection 182 with the link 180 as is best shown in FIG. 18.

The other end of the link 180 is connected on a similar ball joint 183 to a coupling 184 at the end of lever arm 156 which is pivotally connected to the rock shaft 154. Intermediate its length, lever arm 156 has a cam follower roller 185 which is gravity biased against cam 186 mounted on shaft 112. Accordingly, arm 156 is raised and lowered by cam 186 in timed coordination with movement of other parts of the machine so as to swing the label applying arm 162 between the positions of the label carrier respectively shown in FIG. 17 and FIG. 11.

As best shown in FIGS. 12, 16 and 17, the ticket issuing machine has a chute 188 at the bottom end of which there is an electrically energized heater shelf 189 on which the heating plate 170 on the label carrier 148 rests in the FIG. 17 position of the parts. In this position heating plate 170 is positioned to accept a label 160 from the ticket issuing machine 50. When the label carrier 148 is so disposed, the legs 190 on the spring arms 174 strike the rubber bumper 191 on the lowermost edge of chute 188 to open up the fingers 175 of spring arms 174 so that the lower margin of label 160 will be received between the fingers 175 and the heating plate 170. When the label carrier 148 moves away from the chute 188 in the direction of arrow 192 as shown in FIG. 16, the bias of springs 174 will clamp the label 160 against the heater plate 170.

Moreover, as shown in FIG. 17, pressure of the platen 169, etc., will pivot chute 188 about its support pin 167 and against the bias of spring 176 to close switch 177 in circuit with a motor which turns the rolls 159 to discharge the label down the chute 188.

As best shown in FIGS. 12 and 13, the chute 188 may optionally be provided with surface ribs 193, 194 down which the label 160 will slide by gravity. The ribs reduce the area of the frictional surfaces exposed to the label. Moreover, the chute may optionally be enlarged laterally to provide a curved side wall 195 so that if desired, the label 160 can be made to turn through 90° in the course of its travel down the chute. For this purpose a turning pin 198 may be provided and against which a corner of the label will be arrested in the course of sliding down the chute, thus to turn the label around the pivot 198, as is illustrated in the successive dotted line positions of label 160 shown in FIG. 12. Turning the label results in positioning it for greater readability if the packages are to be ultimately stacked in the supermarket meat counter in such a way that the label would otherwise be facing sideways instead of toward the customer.

FIG. 11 illustrates application under pressure of a label 160 to a package 37. Upward movement of the lever 156 causes rotation of the respective motion transmitting gear sectors 179, 178 to swing the arm 162 on its path shown by arrow 192 in FIG. 16 and ultimately press the label 160 against the top of package 37.

Because the packages 37 will have non-uniform height and it is desirable that the stroke of the lever 156 be the same in each cycle of the machine, the disclosed motion transmitting connections from lever 156 to platen 169 provides for lost pivotal motion of arms 162, 164 about pivot 163 after the platen 169 first contacts the package, if the arm 156 has not yet completed its upward stroke. The two arms 162, 164 are simply articulate about pivot 163. Arm 162 will also pivot with respect to the platen on pin 168 so that the relative position of the label with respect to the package will not be changed, notwithstanding the lost motion connection aforesaid.

The platen 169 will also bear through its shoe 171 against the package 37, as shown in FIG. 11, to maintain the hot plate 170 substantially level. The shoe 171 will tend to conform to the contour of the top of the package 37 for leveling purposes. In operation, as the arm 162 swings toward the package 37, platen 169 will swing away from arm 162 until hook 157 engages the arm 162, whereupon both will swing in unison. Platen shoe 171 will be the first to contact the package and in the last increment of swing arm movement hot plate 170 will swing on the axis of pin 168 about the point of contact of shoe 171 with the package as a fulcrum until it also engages the package, whereupon sealing pressure is applied as arm 162 articulates with respect to arm 164 about pin 163, as aforesaid.

The spring 199 biases the label applying arm 162 towards its FIG. 17 position when the upward pressure on the lever arm 156 is relieved. Spring 199 is connected at one end on a pin 200 (FIG. 15) to table leg 51 and at its other end on a pin 201 to an intermediate point on the arm 164. Counter-clockwise movement of arm 164, as viewed in FIGS. 11 and 15, is limited by the adjustable striker bolt 202 which is adjustably threaded in ear 197 at the side of arm 164 and which will abut machine frame member 166.

From the foregoing, it is clear that the timed actuation of lever arm 156 will cycle the label applicator or transfer mechanism through a sequence of movements in timed coordination with the advance of packages 37 through the machine so that a label 160 which is printed with information appropriate for the weight and price of the package will automatically be transferred from the ticket issuing machine 50 and applied to the package 37.

At the completion of the forward stroke of the sweep arms 62, 63, 64, as shown in FIG. 27, a pressure applying foot 141, which desirably comprises a pad of sponge rubber or the like, will be brought down against the top of the package and the intervening label, the package having meanwhile been advanced by the sweep arm 64 to a position immediately beneath the foot 141. For this purpose the foot 141 is mounted on an arm 204 (FIG. 1) having a guide stem 205 which reciprocates vertically in a guide sleeve 206 mounted by bracket 207 on a leg 51 of the machine. The arm 204 has a laterally projecting roller 210 disposed between rails 211 of actuating lever arm 155 which is also pivotally connected on the transverse rock shaft 154 as shown in FIG. 29. Arm 155 has a cam follower roller 213 gravity biased on cam 214 on shaft 112. Cam 214 is actuated in timed coordination with the other parts of the machine so that the foot 141 is not lowered in the direction of arrow 215 in FIG. 27 until the package 37 arrives therebeneath. Foot 141 remains in pressure contact with the label until just before swing fingers 59 push the package toward the receiving bin 61. The presser foot 141 insures adherence of the label to the package.

Because of the automation of the label applying procedure, several electrical interlocks, as shown in FIGS. 22 and 23, are added to the electric circuits for the scale, computer and ticket printer.

The scale 47 is conventionally provided with a switch 218 which in manual operation of the scale is actuated by the arm 219 mounted on the underside of the scale platform 48 to close a circuit from a source 220 of electricity to the electrically operated mechanism of the ticket printer 50 to initiate its operation of printing and issuing a ticket. In conventional manual operation switch 218 is not actuated until the platform 48 returns to its uppermost position. In the instant device, however, the scale platform 48 will ordinarily never return to its uppermost position during operation of the device because, as shown in FIG. 26, as sweep arm 63 removes a package from platform 48, sweep arm 62 is concurrently advancing another package onto the platform. To accommodate for this difference in the mode of machine operation, we bypass switch 218 with shunt switch 221 which is actuated mechanically by cam 222, also shown in FIGS. 2 and 4. Cam 222 is mounted on shaft 120 so as to be driven in timed coordination with movement of the sweep arms and all other functioning apparatus. Accordingly, lobe 223 on the cam 222 will actuate the switch actuator arm 224 of switch 221 once for each cycle of the machine. This actuation will occur at substantially the position of the sweep arms shown in FIG. 26, thus insuring triggering of the ticket printer 50, notwithstanding inoperativeness of switch 218.

Conventionally, computer 46 is actuated after a package has been placed upon the scale platform 48 and after the scale platform has reached a state of complete equilibrium. United States Patent 2,860,867 aforesaid shows a typical circuit by which the computer is energized under these circumstances. In the prior art manual operation of the computer scale a pilot light is illuminated while the computer is functioning and the operator will not remove the package from the scale until the computer has finished its operation and the pilot light is extinguished. Heavier packages will require a longer period of time for computer operation than will lighter packages. In the device of the present invention the cycle of movement of the sweep arms is adjusted so that light weight and medium weight packages may be handled continuously, the computer functioning within the time cycle of the machine for this purpose. However, when a heavier package is processed through the machine, the time lag required for the computer to operate may exceed that provided for in the cycle of the machine. Accordingly, FIG. 23 shows apparatus for de-energizing the motor 83 under such circumstances in order to introduce dwell in the operation of the wrapping machine and labelling machine and permit the computer 46 to finish its cycle of operations before the sweep arms remove the package from the scale platform 48. For this purpose a switch 227 having an actuating arm 228 is placed in parallel with a switch 229 within the computer 46. Switch 229 is actuated by the computing mechanism acting through the operating lever 230 to open the switch 229 whenever the computer is functioning. According to the present invention switch 229 is bypassed by shunt switch 227, the actuating arm 228 of which is ordinarily closed by the pressure of cam 231 on shaft 120 and which is also shown in FIGS. 2 and 5. Thus even though the computer is operating, switch 227 completes the circuit to the motor 83 to maintain the wrapping and labelling machines in operation. Under ordinary circumstances for light weight and medium weight packages switch 229 will be closed by the computer actuated lever 230 within the time cycle of the machine and before the gap 232 in the cam 231 comes opposite the operating lever 228 to open the switch 227. Under such ordinary circumstances when this happens, switch 229 will by that time have been closed by the completion of computer action so that motor 83 will remain energized through the circuit through switch 229. However, when larger packages are being weighed, it may be that switch 229 will not have been closed by the time the gap 232 in cam 231 comes opposite the lever arm 228. In that event switch 227 will open while switch 229 is also open, thus to de-energize the motor 83. All operations are then interrupted until computer 46 completes its computation, thus to close switch 229 and reenergize the motor 83.

FIG. 30 shows in simplified form a modification of the machine as it relates to the mechanism for actuating the sweep arms 62, 63, 64. As in the first described embodiment, the connecting arm 68 for the sweep arms is provided with an upright support post 236, which has on its lower end a wheel 237, which, in the lowermost position of the post which it occupies as the arms sweep forwardly, will ride horizontally along the track 238. The post is adapted to freely slide vertically in a carriage 239 which has wheels 240 which ride along a track 241.

Post 236 has a pin 242 pivotally connected to a lug 243 on a link of chain 244. The chain 244 is trained about sprockets 245 to travel on a rectangular path. One of the sprockets mounts a gear 246 meshing with gear 247 having a sprocket 248 receiving power through a chain 251 from a sprocket 250 on the power take-off shaft 90. Shaft 90 receives power from the motor 83 as shown in FIG. 1.

The gears and sprockets, etc., are so timed that the chain 244 will be driven in timed coordination with the delivery of packages from conveyor 43 onto the cooling grid 52. The packages will be picked up by the sweep arms 62, 63, 64 and moved forwardly on the bed of the labelling machine as the chain travels in the direction of arrow 252, lug 243 is on the lowermost run of the rectangular path and wheel 237 rides along horizontal track 238.

When the link on the chain to which lug 243 is attached passes upwardly around the sprocket 245 to which gear 246 is attached, post 236 will move vertically upwardly in a slideway formed in the carriage 239 to lift the sweep arm assembly upwardly off of the bed of the machine. As the lug passes rearwardly around the upper right-hand sprocket 245 (as viewed in FIG. 30), the sweep arm assembly will reverse direction to carry the arms 62, 63, 64 in elevated position rearwardly and thence downwardly around the upper left-hand sprocket 245 to return the arms to a position where they will pick up the next series of packages. This structure is substantially identical in function to that shown in FIG. 1, in that the arms 62, 63, 64 will cycle in timed coordination with other machine movements to advance packages from one station of the machine to the next.

In FIGS. 31 through 34 we show mechanism by which packages can be labelled manually. Certain packages will inevitably be too large or too small to be effectively processed on the wrapping machine and/or on the automatic labelling machine. Accordingly, provision is made for the manual labelling of such packages using the same scale, computer and ticket issuing machine otherwise integrated into the cycle of the automatic labelling machine. For this purpose the labelling machine 50 is provided with a package rest 255 which may be swung to a position in which it overhangs the chute 188. The package rest 255 has a central opening 256 which is on the path of swinging movement of the heated label carrier 170.

The package rest 255 is desirably supported from a bracket post 257 which is mounted on foot plate 258 bolted or otherwise fastened to a frame portion 264. Post 257 carries a package rest hinge which includes pintle 258 inclined at substantially the same angle as the incline of the carrier 170 when it registers with the rest 255, thus to support the package 37 with its surface against which the label is to be applied substantially parallel to the label carrier. Marginal portions of the package are held against marginal portions of the rest 255 about its opening 256.

To actutae the label carrier swing arm 162 for manual operation thereof, we provide a foot treadle 259 (FIG. 34) connected on a swing joint 260 to lever 261 which pivots about the pin 262 on a depending machine frame bracket 263. The end of the lever 261 is connected on pin 266 to a push rod 267 which is guided for vertical movement on a bracket eye 268. The upper end of rod 267 bears against the undersurface of lever 156 which otherwise is actauted by cam 186 to swing the label carrier arm 162. Accordingly, if the foot treadle 259 is manually depressed, plunger 267 will lift the cam follower roller 185 on lever 156 off of cam 186 and will actuate the swing arm 162 through the linkages hereinbefore described.

When a package 37 is held manually against the package rest 255, the arm 162 will swing through an arc only great enough to bring the carrier 170 up against the surface of the package 137 which is exposed through the package rest opening 256. In order to limit the movement of the arm 162 through this range, we optionally provide axially adjustable stop collars 269, 270 on the push rod 267 at opposite sides of the bracket eye 268. Spring 271 is provided to elevate treadle 259 when foot pressure thereagainst is relieved.

When the machine is set to cycle automatically and there is not need for the package rest 255, it may conveniently be moved out of the way by flipping it about the axis of hinge pin 258 to its position shown in FIG. 33. In any event, opening 256 provides sufficient clearance to pass the label carrier 170 even if the package rest 255 remains in its FIG. 31 position. If the operator wants to weigh and label an oversize or undersize package, the machine is stopped to interrupt its automatic cycle, package guide 255 is flipped to its position shown in FIG. 31, the package placed upon the scale platform 48 to initiate the weighing—computation—ticket issuing sequence, and is then lightly held top-down against the package rest 255. After the computer 46 has finished its computation and the price and weight marked ticket 160 issued from the machine 50, the foot treadle 259 is operated manually to apply the label to the package, as is shown in FIG. 32.

The manually operated mechanism just described does not interfere in any way with previous or subsequent automatic cycling of the machine. The plunger 267 is in lost motion connection with the lever 156. Accordingly, if the treadle is not operated, lever 156 will continue to be operated in its automatic cycle by the cam 186. When the treadle is not needed, it may be swung about the vertical axis of its pivotal coupling 260 to an out-of-the-way position beneath the machine.

The table 53 shown fragmentarily in FIG. 31 is specifically different from the one shown in FIG. 3, for example. In FIG. 3, table 53 is made of a smooth polished plate having slots 54, 55 for the pusher fingers 58, 59. In FIG. 31, the table consists of longitudinal strips 274 laterally spaced sufficiently to accommodate swinging movement of the fingers 58, 59. The strip type table offers less frictional resistance to movement of the packages thereover and is preferred for that reason.

In practice, labelling machines embodying the present invention automatically process packages at the rate of from eighteen to twenty-four packages per minute.

Another example of prior art scales used to manually weigh and label packages is shown in United States Patent 2,948,466.

What is claimed is:

1. A package labelling machine having a bed over which a series of spaced packages are conveyed from a source of unlabelled packages past a series of spaced stations at which various operations with respect to the packages are performed, said stations including a first station having mechanism for weighing the packages and a second station for applying a price label to a previously weighed package, and a corresponding series of spaced sweep arms which concurrently push respective packages in said series of packages from one station toward the next station, and actuating means for concurrently moving said sweep arms in a cycle of sweep arm movement in which the respective arms advance from an initial position behind respective packages along the bed at a level of engagement with the packages and thereafter retract along a path clear of said packages and return to said initial position to engage succeeding packages in a series of packages in a subsequent cycle of movement.

2. The machine of claim 1 in which said actuating means includes means to elevate said sweep arms above the level of said packages during the return stroke thereof.

3. The machine of claim 1 in which the package at one of said stations requires further movement beyond the point at which it is deposited by its sweep arm, said one station being provided with package moving means to impart such further movement to said package.

4. The machine of claim 3 in which said bed has slots adjacent said one station, said package moving means comprising fingers and means on which said fingers are mounted to project through said slots to push a package in one portion of the cycle of the actuating means and to retract beneath the bed in another portion of the cycle of the actuating means.

5. The machine of claim 4 in which said one station is provided with a label securing mechanism having an operating arm, said package moving means comprising means to move the package into the path of the arm.

6. The machine of claim 4 in which said one station is adjacent the end of the bed, said package moving means comprising means to move the package off the bed.

7. In a package labelling machine in which successive packages are sequentially weighed on a scale and a printer prints a label with weight and price indicia appropriate for each package, said printer having a label issuer, the combination of label transport mechanism for transferring a printed label from the label issuer to the printer of a package and affixing it thereto, conveyor means for cyclically advancing packages from the scale to the label transport mechanism, and means for actuating the label transport mechanism in synchronism with the advance of a package to the label transport mechanism which is appropriate for the label delivered by the label issuer of the printer to the label transport mechanism.

8. The machine of claim 7 in which said transport mechanism comprises a swing arm which inverts the label in the course of moving it from the printer toward the package.

9. The machine of claim 7 in which said transport mechanism is provided with a heater to plasticize a thermo-plastic adhesive on the label.

10. The machine of claim 7 in further combination with a presser foot beyond the printer station and to which said conveyor means advances the labelled package and means to actuate said presser foot for pressing the label against the package.

11. The combination with a scale having a weighing platform, of a table for an automatic labelling machine, said table having a first portion at one side of the weighing platform and a second portion at the other side of the weighing platform, first means to support the first and second table portions at substantially the same level and separate second means to support said weighing platform at substantially the same level as the table portions, whereby to isolate said platform from vibrations in the table portions and means to move packages successively from the first table portion to the platform and thence to the second table portion, all at substantially the same level.

12. The device of claim 7 in which the label issuer delivers the label with its printed side down, said label transport mechanism further comprising means to invert the label in the course of transferring it from the label issuer to the package.

13. The device of claim 12 in which the label issuer has a chute down which the label slides, said label carrier means having one position at the lowermost end of the chute to receive the label, said label transportation mechanism having clamp means for retaining the label in the course of its transfer to the package.

14. The device of claim 13 in which said clamp means comprises spring fingers and means to open said fingers to receive the label when the label transport machanism is at the lowermost end of the chute.

15. The device of claim 13 in which the chute has means for turning the label through 90° in its own plane en route from the label issuer to the label carrier.

16. A sweep arm assembly for a machine of the character described and comprising a series of arms adapted to extend laterally over a machine bed, means connecting said arms for unitary movement, guide means for cyclically operating said arms on a path of sweep arm movement including advance of said arms along said bed, and retraction of said arms on a path clear of said bed, said guide means comprising a carriage, a track on which the carriage reciprocates longitudinally of the bed, said carriage having a slideway transverse to its path of reciprocating movement and a post in said slideway and on which said sweep arm assembly is mounted, and means for reciprocating the carriage on its track and sliding said post in its slideway for cyclically operating said arms as aforesaid.

17. The device of claim 16 in which the sweep arms have means connecting them to the post for pivotal movement with respect thereto, and means responsive to such pivotal movement for discontinuing the cyclical operation thereof.

18. Apparatus for applying a label to a package and comprising a label printer having a chute, label transport mechanism comprising label carrier means at the end of the chute, transport mechanism to move the carrier means from the chute toward a package and a package rest overhanging the carrier means and adapted to support a package in the path of carrier movement.

19. The device of claim 18 in which said package rest has a marginal portion against which margins of the package are received, said rest being open within said marginal portion to expose the package to said carrier means.

20. The device of claim 18 in which said package rest has a mounting bracket on which it can be moved to a position away from said chute.

21. The device of claim 18 in combination with a foot treadle and motion transmitting connections from the treadle to the label carrier means.

22. The device of claim 21 in further combination with means for automatically actuating said label carrier means in an automatic cycle of the apparatus, said motion transmitting connection including lost motion means whereby the automatic actuation of the label carrier means is independent of the foot treadle.

23. The combination with a table across which spaced packages are to be conveyed, of a package pushing sweep arm assembly comprising a series of spaced arms extending laterally over said table, means connecting said arms for cyclically operating said arms on an orbital path of sweep arm movement including a first run in which said arms are respectively behind the spaced packages and advance along said table, and a second run in which said arms are clear of the packages and retract along said table but spaced therefrom.

24. The combination of claim 23 in which said means comprises a carriage, a track on which the carriage reciprocates, and means for raising and lowering said arms with respect to said carriage.

25. The combination of claim 24 in which the means first mentioned further comprises means for imparting reciprocating movement to said carriage and includes a pitman, means for oscillating the pitman and means coupling the pitman to the carriage.

26. A package labelling machine having a bed over which a series of spaced packages are conveyed from a source of unlabelled packages past a series of spaced stations at which various operations with respect to the packages are performed, said stations including a first station having mechanism for weighing the packages and a second station for applying a price label to a previously weighed package, conveying means for concurrently conveying respective packages in said series of packages from one station toward the next station, and control means for coordinating the action of said conveying means with the operation of the weighing mechanism at the first station and the labelling mechanism at the second station.

References Cited by the Examiner
UNITED STATES PATENTS

| | | | |
|---|---|---|---|
| 1,869,374 | 8/32 | Jahne | 216—53 |
| 2,259,445 | 10/41 | Arelt | 216—53 |
| 2,503,815 | 4/50 | Frohlich | 156—398 |
| 2,579,602 | 12/51 | Niederer et al. | 198—221 X |
| 2,613,008 | 10/52 | Ouellette | 216—53 X |
| 2,808,921 | 10/57 | Knowles | 198—31 |
| 2,948,466 | 8/60 | Allen et al. | 216—2 X |

EARL M. BERGERT, *Primary Examiner.*

GEO. A. NINAN, JR., *Examiner.*

UNITED STATES PATENT OFFICE
CERTIFICATE OF CORRECTION

Patent No. 3,194,710

July 13, 196

William F. Stremke et al.

It is hereby certified that error appears in the above numbered patent requiring correction and that the said Letters Patent should read as corrected below.

Column 3, line 37, for "2,800,867" read -- 2,860,867 --; column 4, line 3, for "83" read -- 73 --; column 10, line 28, for "actutae" read -- actuate --; line 36, for "actauted" read -- actuated --; line 53, for "not" read -- no --; column 11, lines 65 and 66, for "to the printer of" read -- of the printer to --; column 12, line 31, for "transportation" read -- transport --; same column 12, line 36, for "machanism" read -- mechanism --.

Signed and sealed this 18th day of January 1966.

(SEAL)
Attest:

ERNEST W. SWIDER
Attesting Officer

EDWARD J. BRENNER
Commissioner of Patents